United States Patent Office 2,972,228
Patented Feb. 21, 1961

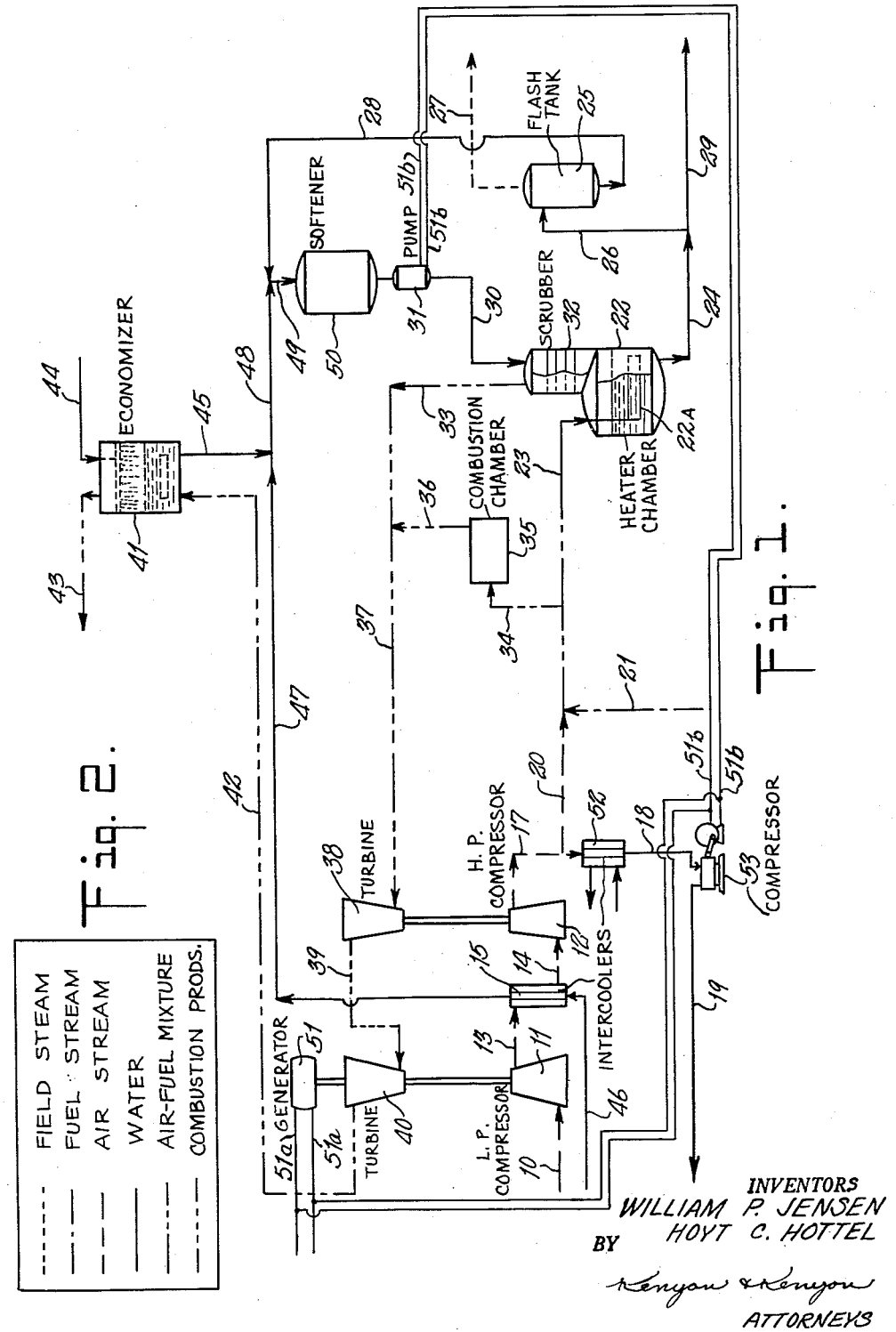

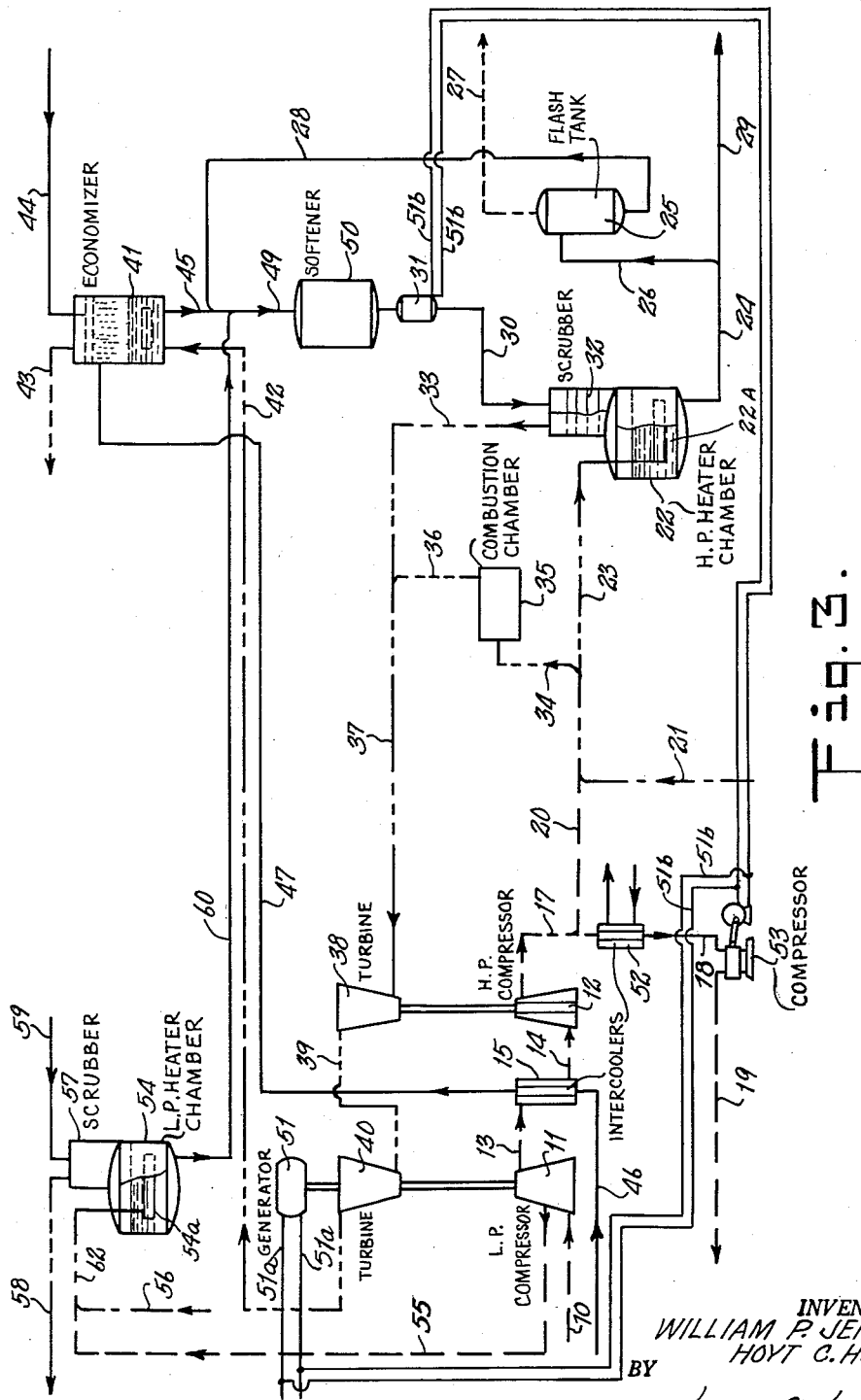

2,972,228

METHOD AND APPARATUS FOR DIRECT CONTACT HEATING OF WATER

William P. Jensen, Cambridge, and Hoyt C. Hottel, Winchester, Mass., assignors to Texas Gulf Sulphur Company, New York, N.Y., a corporation of Texas Filed Apr. 6, 1953, Ser. No. 347,124

4 Claims. (Cl. 60—39.05)

This invention relates to method and apparatus for direct contact heating of water. It relates especially to such heating of water to temperatures above its boiling point at ordinary atmospheric pressure.

One industrial application of water heated to a temperature substantially above its boiling point at atmospheric pressure is the supply of water heated to a temperature of about 325° F., for example, for use in a sulfur mining operation. Heretofore such heated water has been supplied by condensing boiler steam in water. It is an object of this invention to supply such heated water by a method and an apparatus which, as compared with prior practice, is of improved efficiency, utilizes a more compact and simpler installation, is free from scaling difficulties and entails lower operating and maintenance costs.

It has heretofore been proposed to heat water by directly contacting water with a combustible mixture undergoing combustion. Such an operation is frequently referred to as submerged combustion inasmuch as a zone of combustion is maintained substantially submerged below the level of water in a heating chamber. The present invention relates to improvements in a method and an apparatus wherein water is heated by the submerged combustion of a combustible mixture of air and fuel.

In the practice of this invention both water to be heated and a mixture of air and fuel are directed into a heating zone or chamber under superatmospheric pressure. The combustible mixture is burned in direct contact with the water in the heating zone, thus heating the water which the system supplies. The resulting products of combustion under superatmospheric temperature and pressure are removed from the zone and the withdrawn products of combustion are utilized for actuating the compressor for compressing the air which is comprised in the combustible mixture that is directed into the water heating zone and burned therein in direct contact with the water. In this way the system not only effects the heating of the water but also is self-actuating in that the power requirements for maintaining the conditions under which the water is heated to the desired temperature are afforded as an incident to the maintenance of such conditions. In fact power somewhat in excess of that required for maintaining the water heating conditions may be taken from the system for such purposes as may be applicable in a plant in which the system is employed.

It is an advantage and feature of this invention that the conditions of pressure required for maintaining submerged combustion and the power requirements for supplying a combustible mixture under pressure adequate for maintaining submerged combustion have been substantially reduced by directing water into the submerged combustion zone in countercurrent direct contact heat exchange relation with products of combustion produced in said zone.

Further features of this invention relate to the preheating of the water which is introduced into the primary heating zone. To effect such preheating products of combustion resulting from the burning of the combustible mixture in direct contact with water are availed of after the part of the energy contained in such products of combustion has been utilized in effecting compression of air comprised in the combustible mixture. Such preheating may also be effected by transferring to water entering the system heat resulting from partial compression of air comprised in the combustible mixture.

A further feature of this invention whereby equipment costs for turbine and compression units may be minimized resides in effecting preheating of water by the submerged combustion of a combustible mixture so as to partially heat water entering the system, the water thus preheated thereafter being subjected to superatmospheric pressure and heated to its desired ultimate temperature by a second heating step wherein the water is again brought into direct submerged contact with a burning combustible mixture.

A further feature of this invention resides in mixing products of combustion resulting from the burning of a combustible mixture in direct contact with water with products of combustion produced by the burning of a combustible mixture in a hot combustion chamber or zone to produce a resulting mixture which is at a substantially higher temperature than the temperature of the products of combustion withdrawn from direct contact with the water that is heated. Such mixture of the products of combustion produced as aforesaid may then advantageously be used for actuating suitable means, e.g. gas turbine means, through which the mixed products of combustion under superatmospheric temperature and pressure pass with attendant lowering of the temperature and pressure thereof, thereby providing mechanical energy for operating the compressor for compressing air which is mixed with the fuel that is burned. By thus employing at least two burners, one of which is used to heat water in direct submerged contact with the burning combustible mixture and the other of which is non-submerged so as to provide products of combustion at a much higher temperature, and then mixing the products of combustion produced by the two burners, the power requirements are more effectively met and better control can also be afforded.

Alternatively, one may, if desired, employ a single non-submerged burner in conjunction with a regenerator so that combustion products from the submerged burner become mixed with combustion products from a non-submerged burner and are caused to pass, before entering the first turbine, through the regenerator in out of contact heat exchange relation with gases discharged from the first turbine prior to passage of said gases through a second turbine, the regenerator being so designed and operated as to permit control of the temperature of gases entering each turbine.

Further objects, features and advantages of this invention will be apparent from the following description of certain typical examples in the practice of this invention in connection with the accompanying drawings, wherein Fig. 1 is a flow sheet schematically illustrating method and apparatus for heating water utilizing a single stage of submerged combustion;

Fig. 2 is a tabulation of legends indicating the significance of the different types of representation for the various lines as shown in Fig. 1 and also as shown in Fig. 3, and Fig. 3 is a flow sheet similar to Fig. 1 which illustrates a preferred utilization of this invention wherein direct contact heating of water is effected in two stages.

In Fig. 1 a flow diagram is shown which illustrates the application of the method and apparatus according to this invention in the heating of water by direct contact with a burning combustible mixture of air and fuel. In order to afford a specific example, this invention will be described in connection with a typical operation adapted to supply water at a temperature of substantially 325° F. at the rate of about 1,040,000 pounds per hour (or 3,000,000 gallons per day). Where reference is made to pounds of fluid at different points in the system the reference is to pounds per hour.

For providing the combustible mixture, air is introduced into the system by the line 10 under prevailing atmospheric conditions, as for example, at a temperature of about 87° F. and about 14.7 pounds per square inch absolute (p.s.i.a.). 208,700 pounds of air are fed by the line 10 into the low pressure compressor 11 and into the high pressure compressor 12 by the lines 13 and 14. The air in being directed from the low pressure compressor 11 to the high pressure compressor 12 is passed through the intercooler 15 in out of contact heat exchange relation with a portion of water being fed into the system. This is preferred practice according to this invention in that the amount of power for effecting compression of air can be minimized and the heat resulting from the compression of the air may be used to preheat a portion of the water in the system as will be described more in detail below. The effect of the intercooler 15 is such that the partially compressed air will pass to the compressor 12 at a temperature of about 105° F. The air compressed by the high pressure compressor 12 is directed therefrom by the line 17 at a pressure of about 115 p.s.i.a. and at a temperature of about 331° F.

While it is not essential to the operation of the system according to this invention, nevertheless, the flow diagram of Fig. 1 illustrates how the system for heating the water can also be utilized for supplying air under pressure as, for example, is usual practice in a sulfur mining operation. For such purpose a small amount of the air which has been compressed by the compressors 11 and 12, such as about 1,590 pounds, may be directed out of the system through the lines 18 and 19. If desired the air directed through these lines may be first cooled by the intercooler 52 to a temperature of about 105° F. and then compressed by the compressor 53 for supply at a pressure of about 465 p.s.i.a. and a temperature of about 455° F.

The balance of the air compressed by the compressors 11 and 12, namely, about 207,100 pounds, is directed by the line 20 so as to become commingled with fuel which is fed into the system by the line 21. The fuel may be natural gas which is available at a pressure of about 115 p.s.i.a. and at a temperature of about 87° F. If the natural gas is fed into the system at the rate of about 12,400 pounds per hour a combustible mixture is afforded which contains approximately 5% of air in excess of that which is required to afford complete combustion of the gas.

A portion of the resulting combustible mixture which is at a temperature of about 300° F. and a pressure of about 115 p.s.i.a. is directed to the water heating chamber 22 by the line 23. Substantially 83% of the combustible mixture, i.e. substantially 182,200 pounds, is directed to a burner 22a in the water heating chamber 22 which is adapted and arranged to burn the combustible mixture while it is submerged below the level of the water therein. Suitable burner means for effecting submerged combustion of the combustible mixture is well known. It is the usual practice in effecting submerged combustion to have the primary zone of combustion about 4 feet below the level of liquid in direct contact with the burning mixture of air and fuel so that the burning mixture as well as the resulting products of combustion are afforded an opportunity for transferring the heat of combustion to the water to be heated. The formation of bubbles in the water and their movement therein also has the advantage of agitating the water and making the conditions for effective heat transference more uniform.

As a result of the burning of the combustible mixture in the water heater chamber 22 in direct contact with the water, the water is heated to a temperature of about 325° F. so that it may be passed from the chamber 22 by the line 24 at this temperature at the rate of about 1,216,500 pounds per hour.

For providing a supply of steam for use in connection with a sulfur mining operation or the like, a small portion of the water which has been heated in the heater 22 may be directed to the flash tank 25 by the line 26. For example, about 176,500 pounds of the heated water are directed to the flash tank 25 for producing about 14,300 pounds of steam which may be taken from the tank 25 by the line 27 at a temperature of about 250° F. and at a pressure of about 29.8 p.s.i.a. Residual water at a temperature of about 250° F. may be recycled into the system at the rate of about 162,200 pounds per hour by the line 28.

The balance of the water which is heated in the chamber 22 and which is not used for generating steam is taken from the system by the line 29. It is this line which affords the supply of heated water at a temperature of about 325° F. and at the rate of about 1,040,000 pounds per hour.

Water to be heated in the heater 22 is directed thereto by the line 30 at the rate of about 1,216,500 pounds per hour after having been preheated to a temperature of about 148° F. in a manner which will be described more fully hereinbelow. The preheated water is directed to the heater 22 under superatmospheric pressure provided by the pump 31, this pressure, according to the example given, being about 110 p.s.i.a. It is a feature of this invention that the preheated water, instead of being fed directly into the chamber 22 and into the zone wherein the water is brought into direct contact with the burning combustible mixture, is directed in counterflow direct contact heat exchange relation with the products of combustion produced by the submerged combustion of the combustible mixture in the heater 22. This counterflow of the incoming water with the products of combustion is effected in the scrubber 32 which may be a bubble tower of conventional type or other similar means for directing a liquid in counterflow direct contact heat exchange relation with a gaseous material. By thus employing the scrubber 32 the pressure maintained in the heater 22 may more closely approach the vapor pressure of water at 325° F. which is 96.2 p.s.i.a. If the counterflow of the incoming water with the products of combustion is not effected it would be necessary to maintain the combustion gases discharged from the heater 22 at a pressure of about 132 p.s.i.a. However, by directing the products of combustion in countercurrent direct contact with the incoming water a suitable temperature differential between the products of combustion and the incoming water is afforded and the products of combustion may be taken from the scrubber at a temperature substantially below that to which the water is heated in the chamber 22. Thus, in the exemplified operation the products of combustion are taken from the scrubber 32 by the line 33 at a temperature of about 219° F. and at a pressure of about 110 p.s.i.a. This permits the combustible mixture which is fed into the heater 22 for combustion therein to be supplied at the relatively low pressure of about 115 p.s.i.a. which is substantially below the pressure which would have to be maintained in supplying the combustible mixture if the scrubber 32 were not employed. This means that the power required for supplying the combustible mixture is correspondingly less. Since the amount of water vapor produced by the combustion of the natural gas contained in the combustible mixture directed into the heater 22 is just sufficient to saturate the rest of the products of combustion under the prevailing conditions at which the products of combustion are withdrawn from the scrubber 32, namely, 219° F. and 110 p.s.i.a., there is no gain or loss in the amount of products of combustion as compared with the combustible mixture supplied to the heater 22 and the products of combustion are withdrawn from the scrubber 32 by the line 33 at the rate of about 182,200 pounds per hour.

About 17% of the combustible mixture produced by mixing the air compressed by the compressors 11 and 12 with the natural gas supplied by the fuel line 21, namely, about 37,300 pounds, is directed by the line 34 to a burner in the hot combustion chamber 35 wherein the combustible mixture burns and is converted into products of combustion at a temperature of about 3800° F. at 110 p.s.i.a. These products of combustion are immediately directed by the line 36 so as to be commingled with the products directed from the scrubber 32 by the line 33 so as to form a mixture of the products of combustion in the line 37, the mixture being at a temperature of about 955° F. and at a pressure of about 110 p.s.i.a. This mixture is utilized for furnishing power for operating the compressors 11 and 12.

Any suitable type of motor adapted to utilize the energy of the products of combustion for operating the compressors 11 and 12 may be availed of for this purpose. More specifically the mixture of products of combustion, i.e. about 219,500 pounds, is directed by the line 37 to the high pressure gas turbine 38 which operates the high pressure compressor 12. The products of combustion are then directed by the line 39 to the low pressure gas turbine 40 which operates the low pressure compressor 11. By thus utilizing the energy contained in the products of combustion to operate the turbines 38 and 40, the temperature and pressure of the products of combustion become reduced to about 500° F. and about 16 p.s.i.a., respectively, as they emerge from the turbine 40. There is, however, a substantial amount of energy remaining in the products of combustion which can be utilized by directing the products of combustion to the economizer 41 by the line 42. The economizer preferably is the type which provides means for bringing incoming water into direct contact heat exchange relation with the products of combustion. In the economizer any water vapor comprised in the products of combustion becomes condensed and the gaseous combustion products remaining are removed at the rate of about 206,000 pounds per hour from the economizer 41 by the line 43, the removed gases being at a temperature of about 100° F. and at a pressure of about 14.7 p.s.i.a.

The bulk of the water which is fed into the system to be heated is passed through the economizer 41. Thus, about 778,000 pounds of water at a temperature of about 87° F. may be directed into the economizer 41 by the line 44 wherein it is heated and then discharged from the economizer 41 by the line 45. Due to the condensation of water vapor, the amount of water directed from the economizer 41 by the line 45 is about 801,800 pounds per hour. The water becomes preheated in the economizer to a temperature of about 134° F.

As mentioned above the heat of compression which is removed from the incoming air during compression thereof by the intercooler 15 in order to provide better and more efficient conditions for effecting desired compression may be utilized to preheat a portion of the water directed into the system. Thus, about 252,500 pounds of water at about 87° F. may be directed by the line 46 to the intercooler 15 in which it becomes heated to a temperature of about 127° F. This preheated water is then directed by the line 47 so as to become commingled with the water which has been preheated in the economizer 41, thereby providing a supply of water in the line 48 at the rate of about 1,054,000 pounds and at a temperature of about 132° F. This water is further commingled with the water returned to the system from the flash tank 25 by the line 28 to form a supply of water in the line 49 which is at a temperature of about 148° F. and which, as aforesaid, is fed into the scrubber 32 and then into the chamber 22 by the line 30 under the influence of the pump 31. Preferably a softener 50 is employed for removing any undesirable water hardening ingredients contained in the water. Many different types of suitable water softener units are well known.

Under the conditions mentioned hereinabove sufficient energy is contained in the products of combustion supplied to the turbines 38 and 40 not only for operating the compressors 11 and 12 to compress the air comprised in the combustible mixture, but also for other aspects of the operation of the system and, if desired, other plant usage. Thus, energy may be availed of by causing the gas turbine means to operate an electric generator such as the generator 51. Electrical energy produced by the generator 51 may be used, for example, to operate the pump 31 and also the compressor 53 by electrical conductors 51a and 51b. If desired, electric current produced by the generator can likewise be used for other plant purposes depending on the controls maintained in the system.

In connection with the foregoing example it is assumed that the efficiency of the turbines and of the compressors is approximately 85% and that the efficiency of the heat transfer effected in direct contact with the water to be heated is substantially 100%. If equipment of different efficiencies were to be employed corresponding allowances would have to be made in the example described hereinabove. Moreover, the foregoing example is based on the assumption that a supply of natural gas is available at a pressure of about 115 p.s.i.a. If such a supply of natural gas is not available at such pressure and has to be compressed then a corresponding allowance would have to be made for providing energy, e.g., about 1,000 H.P., for compressing the supply of natural gas.

While specific figures have been given in connection with the foregoing example it is to be understood that this has been done for purposes of illustration and that the specific operation as hereinabove described may be varied in a number of different respects. The principal variables which effect the net power output and its utilization in the system are the proportioning of the flow of the combustible material as between the water heating chamber 22 and the hot combustion chamber 35 and the temperature of the products of combustion at the outlet of the scrubber 32. Generally speaking an increase in the proportion of the combustible mixture which is burned in the hot combustion chamber 35 increases the amount of power which is available other than for water heating purposes and such power increase may also be effected upon increasing the temperature at which the products of combustion are withdrawn from the scrubber. However, for most purposes it is desirable to burn as great a proportion of the combustible mixture in the chamber 22 for the purpose of effecting submerged combustion in the heating of water as is consistent with effective gas turbine operation, and the above described proportion wherein about 83% of the combustible mixture is used for this purpose and about 17% of the combustible mixture is burned in the hot combustion chamber has been found to be most satisfactory under conditions which are normally encountered in a system of the type shown in Fig. 1.

An alternative system for the practice of this invention is illustrated by the flow sheet of Fig. 3 wherein a greater proportion of the energy supplied is used in preheating the water in the low pressure portion of the system. According to this modification water is heated by direct contact submerged combustion effected in two stages, one stage being effected in the low pressure portion of the system and the other stage being effected in the high pressure portion of the system. In this way the size and cost for the compressors and the turbines used in the system can be minimized. Moreover, the system is one which can be readily controlled and in which maintenance of desired scrubber temperature differentials is consistent with the employment of reasonably sized equipment.

The flow sheet of Fig. 3 has been shown as employing essentially the same elements as those shown in Fig. 1 to which there has been added means for heating water in the low pressure portion of the system by direct contact with a burning combustible mixture of air and fuel. To the extent that the elements shown in Fig. 3 are the same as the elements shown in Fig. 1, such elements have been indicated in Fig. 3 by the same reference characters as those employed in Fig. 1. The principal difference between the system of Fig. 3 as compared with the system of Fig. 1 lies in the use of the lower pressure water heating chamber 54. In this chamber there is a burner to which a portion of the air which has been partially compressed by the compressor 11 is directed by the line 55 after having been mixed with a fuel such as natural gas that is supplied by the line 56 to form a combustible mixture. The burner in the chamber 54 is of the type hereinabove described which is adapted to burn the combustible mixture while submerged below the level of the water in the chamber 54. The resulting products of combustion are directed from the chamber 54 through the scrubber 57 and are thereafter directed out of the system by the line 58. Water to be heated is fed by the line 59 into the scrubber 57 and thence into direct contact with the burning combustible mixture in the chamber 54 to effect preheating of the water. The preheated water is then taken by the line 60 and commingled with other portions of the water which are also fed into the system and which have been preheated in the low pressure portion of the system prior to being directed into the high pressure water heating chamber 22 under the influence of the pump 31.

When the submerged combustion is utilized to heat the water in two stages then the flow of fluids in the system is necessarily somewhat different as compared with that hereinabove described and exemplified in connection with the system shown in Fig. 1. Typical flow of fluids illustrating the practice of this invention in connection with the system shown in Fig. 3 will now be described. As in the example hereinabove described in connection with Fig. 1, the following example with reference to the system of Fig. 3 is based on the supply of about 1,040,000 pounds of water per hour at a temperature of about 325° F.

207,900 pounds of air at a temperature of about 87° F. and at a pressure of about 14.7 p.s.i.a. are introduced into the system by the line 10 for compression by the compressor 11. A portion of the air introduced into the compressor 11, namely, about 64,200 pounds, is bled therefrom at a pressure of about 19.7 p.s.i.a. and at a temperature of about 143° F. The utilization of this portion of the air bled from the compressor 11 will be described hereinbelow. The balance of the air, namely, 143,700 pounds is passed through the compressors 11 and 12 which serve to compress the air to a pressure of about 115 p.s.i.a. The air is cooled by the intercooler 15 to a temperature of about 105° F. and it emerges from the compressor 12 at a temperature of about 331° F.

A small portion of the compressed air can be directed out of the system by the lines 18 and 19, and subjected to the intercooler 52 and the action of the pump 53. This portion of the air may correspond to that hereinabove mentioned in connection with the example illustrating the operation of the system of Fig. 1, namely, about 1,590 pounds, and may be supplied at the same temperature and pressure. The balance of the compressed air, namely, about 142,100 pounds is passed through the line 20 so as to be commingled with about 8,500 pounds of natural gas which is supplied by the line 21 at a pressure of about 115 p.s.i.a. and at a temperature of about 87° F.

The resulting mixture is such that there will be about 5% of air in excess of that required to effect complete combustion of the natural gas. The resulting mixture is at the pressure of 115 p.s.i.a. and at a temperature of about 300° F. About 121,100 pounds of this combustible mixture is directed to the high pressure water heating chamber 22 by the line 23 where it is burned in submerged direct contact with the water in the heater 22. About 1,216,500 pounds of water are discharged from the chamber 22 by the line 24 at a temperature of about 325° F. Of this, the heated water supplied by the system, namely, about 1,040,000 pounds at about 325° F., is taken from the system by the line 29. As above described in connection with Fig. 1, the balance of the heated water, i.e. about 176,500 pounds, is directed to the flash tank 25 by the line 26 so that about 14,000 pounds of steam at a temperature of about 250° F. and at a pressure of about 29.8 p.s.i.a. may be taken from the system by the line 27. About 162,200 pounds of water are returned to the low pressure part of the system at a temperature of about 250° F. by the line 28.

The products of combustion are taken from the scrubber 32 by the line 33 at the rate of about 131,200 pounds per hour, at a temperature of about 246° F. and a pressure of about 110 p.s.i.a. These products of combustion are mixed with the products of combustion formed in the hot combustion chamber 35, i.e. about 29,500 pounds, which are taken therefrom by the line 36 at a temperature of about 3,800° F. and at a pressure of about 110 p.s.i.a. The mixed products of combustion, namely, about 160,700 pounds, which are at a pressure of about 110 p.s.i.a. and at a temperature of about 1,000° F., are directed into the high pressure turbine 38 and thence to the low pressure turbine 40 from which they are discharged at a temperature of about 529° F. and a pressure of about 16 p.s.i.a. The residual energy in the products of combustion is then recovered by directing them by the line 42 to the economizer 41. The residual gaseous products of combustion remaining after condensation of water vapor in the economizer 41 are discharged from the system at the rate of about 141,100 pounds per hour, at a temperature of about 100° F. and at substantially atmospheric pressure, namely, 14.7 p.s.i.a. In the economizer 41 the residual energy contained in the combustion gases after passage through the turbines is used to preheat about 176,900 pounds of water which are fed into the system at a temperature of about 87° F. by the line 44. About 174,300 pounds of water at a temperature of about 87° F. are also introduced into the system by the line 46 so as to be heated in the intercooler 15 wherein it receives heat. This portion of the water introduced into the system is directed into the economizer 41 so that it may be further heated therein to the desired temperature. The water preheated in the economizer 41 is discharged therefrom by the line 45 at the rate of about 370,800 pounds per hour and at a temperature of about 210° F. which, it may be noted, is substantially higher than the temperature to which the water becomes preheated in the low pressure part of the system shown in Fig. 1.

The bulk of the water which is introduced into the system shown in Fig. 3 at a temperature of about 87° F., namely, about 689,400 pounds, is directed by the line 59 into the scrubber 57 and is then directed into the low pressure heater 54 for direct contact with the burning combustible mixture which heats the water to a temperature of about 210° F. Due to vapor condensation the amount of water discharged from the chamber 54 is about 693,600 pounds.

For heating the water in the chamber 54 the air bled from the compressor 11 is mixed with about 3,850 pounds of natural gas which is at a pressure of about 19 p.s.i.a. and which is at a temperature of about 87° F. The resulting combustible mixture, namely, about 68,050 pounds which is at a temperature of about 136° F. and which is at a pressure of about 19.7 p.s.i.a., is directed into the chamber 54 by the line 62 wherein it is burned in submerged direct contact with the water.

The water which has been preheated substantially to its boiling point in the chamber 54 is directed therefrom by the line 60 so as to be commingled with the water which has been preheated to a like temperature in the economizer 41 and with the relatively small amount of water that is returned to the system from the flash tank 25 by the line 28. The streams combine so that about 1,226,600 pounds per hour of water are supplied at a temperature of about 215° F. into the high pressure part of the system by the line 49, preferably after having passed through the softener 50. The preheated water so supplied is subjected to superatmospheric pressure by the pump 31 and is directed by the line 30 to the scrubber 32 and thence into the chamber 22 wherein the heating of the water is completed in the high pressure portion of the system.

By employment of the system shown in Fig. 3 it is possible to substantially reduce the horsepower requirements for compressing air comprised in the fuel mixture by about 25% to 30% as compared with the system shown in Fig. 1, with resultant substantial decrease in the size and cost of the turbine and compressor units employed. The preheating of the water when using the system shown in Fig. 3 to a substantially higher temperature than that which is effected using the system shown in Fig. 1 requires the maintenance of a higher temperature for the products of combustion at the outlet of the scrubber 32 so as to maintain a temperature differential in the scrubber consistent with good efficiency. Due to this fact there is, according to the operation described above, some evaporation of water in the scrubber which is taken off with the products of combustion in the form of vapor that is subsequently condensed in the economizer and the operation described in connection with Fig. 3 differs in this respect from the operation described in connection with Fig. 1. For example, such evaporation of water occurs if the products of combustion are taken from the scrubber at a pressure of about 110 p.s.i.a. if the temperature thereof is above 219° F. As was the case in connection with the example described in connection with Fig. 1, the example applicable to Fig. 3 assumes turbine and compressor efficiencies of 85% and heat exchange efficiency in direct contact with water of 100%.

While this invention has been described in connection with certain exemplifications it is to be understood that this has been for the purpose of affording illustrations of the application of the principles involved, and that the practice of this invention in accordance with and utilizing these principles may be varied. Thus, the conditions prevailing in the various portions of the system as hereinabove described are not necessarily the optimum for each of the operations as individually considered, but the operations are interrelated in the system as a whole and in the foregoing examples the conditions prevailing in the various component operations are such as to provide an average that affords good over all operating conditions. However, other specific conditions for an individual operation may be selected, and if selected in proper relation to the conditions prevailing in other portions of the system good over all operating conditions may be afforded in ways other than those hereinabove specifically exemplified. Moreover, suitable operating conditions are subject to adjustment depending upon such factors as the size and capacity of the equipment units and the proportion of energy to be taken from system for purposes other than use in providing an effluent stream of heated water. Elimination of the economizers, while possible, would result in less efficient use of the fuel and would require an increase in the amount of fuel supplied. In addition to the above, the practice of this invention may also be varied in other ways without departing from the scope thereof as hereinabove described and illustrated.

We claim:

1. A method of heating water which comprises directing water to be heated into a first heating zone under superatmospheric pressure, directing a combustible mixture of air and fuel under superatmospheric pressure into said first heating zone, burning said combustible mixture in direct submerged contact with water in said first heating zone, directing heated water from said first heating zone, directing water to be heated to a second heating zone, directing a combustible mixture of air and fuel under superatmospheric pressure into said second heating zone, burning said combustible mixture directed into said second heating zone in direct submerged contact with water in said second heating zone, directing water heated in said second heating zone from said second heating zone into said first heating zone under the influence of a pump which maintains said superatmospheric pressure at which said water is directed into said first heating zone substantially higher than the pressure prevailing in said second heating zone, withdrawing products of combustion at superatmospheric temperature and pressure from said first heating zone, and utilizing said products of combustion withdrawn from said first heating zone to compress air comprised in said combustible mixture directed into said first heating zone and in said combustible mixture directed into said second heating zone.

2. A method according to claim 1 wherein a combustible mixture of air and fuel under superatmospheric pressure is burned in a hot combustion zone, the products of combustion produced in said hot combustion zone are mixed with the products of combustion withdrawn from said first heating zone, and the resulting mixture is utilized to compress air comprised in the combustible mixture directed into said first heating zone, the combustible mixture directed into said second heating zone, and the combustible mixture directed into said hot combustion zone; and wherein said resulting mixture thereafter is directed into heat exchange relation with water directed into said first heating zone while said water is at a pressure substantially below that prevailing in said first heating zone.

3. Apparatus for heating water which comprises in combination compressor means, means for directing air into said compressor means for compression therein, means for mixing fuel with air compressed by said compressor means, a first water heating chamber, water feeding means comprising a pump for introducing water to be heated into said chamber under superatmospheric pressure, a burner in said chamber, means for directing fuel-containing air compressed by said compressor means to said burner, said burner being adapted and arranged to burn fuel-containing air directed thereto while submerged below the level of liquid in said first water heating chamber, means for directing heated water from said first water heating chamber, a second water heating chamber, means for feeding water into said second water heating chamber, means for directing water from said second water heating chamber to the low pressure side of the pump comprised in said means for feeding water to be heated into said first water heating chamber, a burner in said second water heating chamber, means for directing fuel-containing air compressed by said compressor means to said burner in said second water heating chamber, said burner in said second water heating chamber being adapted and arranged to burn said fuel-containing air directed thereto while submerged below the level of liquid in said second water heating chamber, gas turbine means for operating said compressor means, means for directing products of combustion from said first water heating chamber to said gas turbine means for actuating same, heat exchange means, and means for directing said products of combustion from said gas turbine means into said heat exchange means in heat exchange relation with water which is directed into said first water heating chamber by said water feeding means and which is on the low pressure side of said pump 4. Apparatus according to claim 3 which comprises a combustion chamber, a burner in said combustion chamber, means for directing fuel-containing gas to said burner in said combustion chamber for combustion therein, and means for commingling products of combustion produced in said combustion chamber with products of combustion directed from said first water heating chamber to said gas turbine means.

References Cited in the file of this patent

UNITED STATES PATENTS

| Re. 14,726 | Lillie | Sept. 16, 1919 |
| 812,217 | Lowe | Feb. 13, 1906 |
| 855,726 | Noyes | June 4, 1907 |
| 2,482,819 | Williams | Sept. 27, 1949 |
| 2,647,370 | Miller | Aug. 4, 1953 |
| 2,781,635 | Brogdon | Feb. 19, 1957 |

FOREIGN PATENTS

| 4,492 | Great Britain | Feb. 28, 1908 |
| 545,272 | Germany | Feb. 27, 1932 |